April 7, 1964 C. H. HEUER 3,128,334
COLOR TELEVISION
Filed Jan. 3, 1962
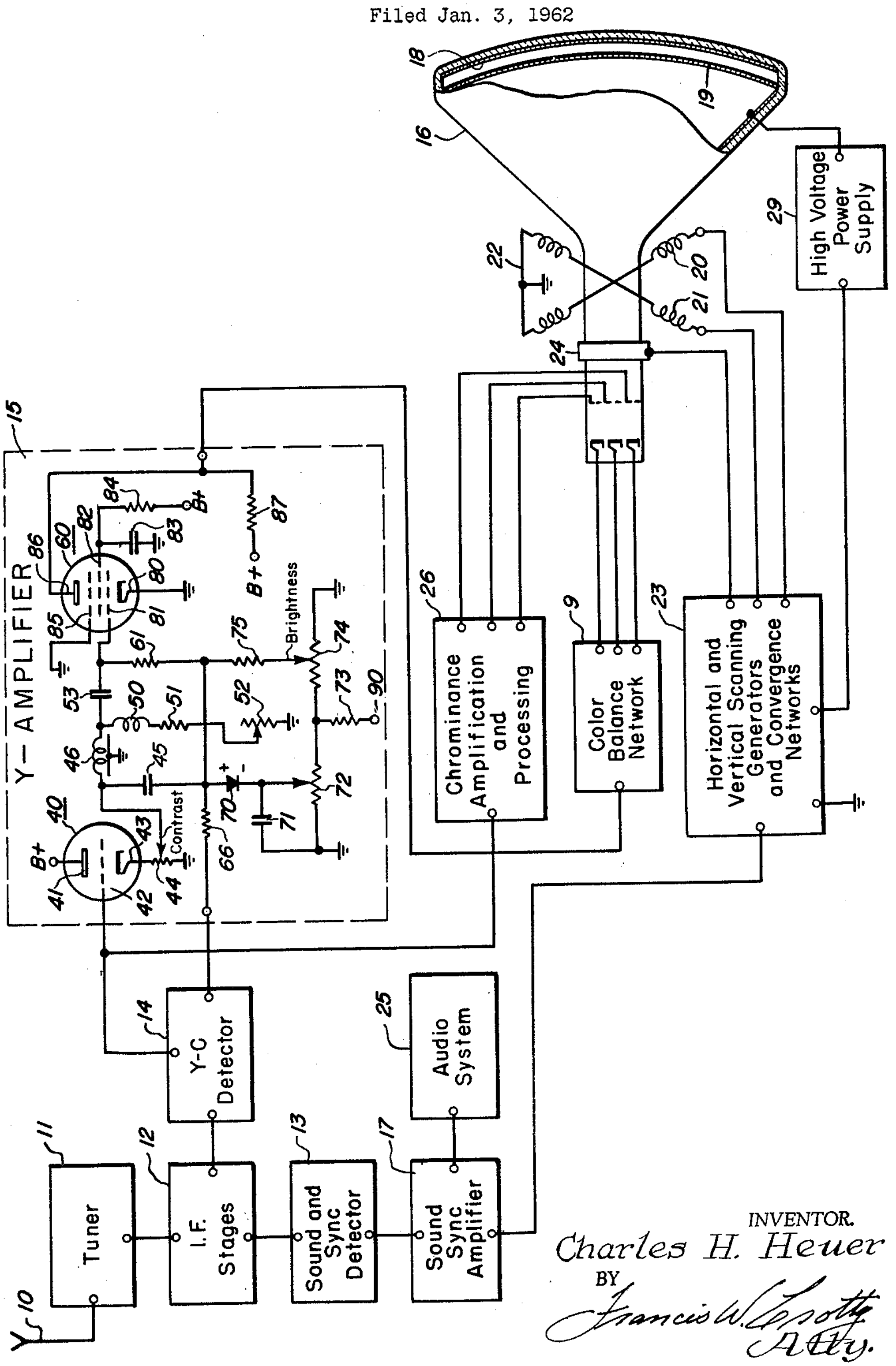
INVENTOR.
Charles H. Heuer
BY
Francis W. Crotty
Atty.

United States Patent Office 3,128,334

Patented Apr. 7, 1964

3,128,334
COLOR TELEVISION

Charles H. Heuer, Glencoe, Ill., assignor to Zenith Radio Corporation, Chicago, Ill., a corporation of Delaware Filed Jan. 3, 1962, Ser. No. 164,121
3 Claims. (Cl. 178—5.4)

The present invention relates generally to luminance control circuitry for use in television receivers. More particularly, it relates to control circuitry which prevents overloading of the high-voltage power supply of a color television receiver.

In a conventional monochrome television receiver, the reproduced image consists of elemental areas which may range from black through white depending on the image content. If a reproduced picture is predominantly black or dark gray, white highlights are important in giving the reproduced image the proper contrast to please a viewer. In addition, a viewer finds it most pleasing to have the brightest image possible with any contrast control setting irrespective of image content. When seeking maximum brightness and high contrast conditions, a limitation may be encountered in that the amount of second anode current required to establish that condition may not be available due to the inability of the power supply to provide it.

In color television receivers, the shade levels of the reproduced image correspond to the brightness components of the luminance signal which along with the chrominance signal define the picture information of the transmitted signal. In particular, the brightness information of a televised scene is transmitted by the luminance signal which is amplitude-modulated on a main carrier wave while the information necessary for the reproduction of color content or chrominance in the scene is transmitted by a phase and amplitude-modulated sub-carrier wave.

In conventional color receivers employing shadow mask tubes, the high voltage power source which supplies the second anode current of the image reproducer must provide a higher power output than its counterpart in monochrome receivers. This is necessary because only approximately one-third of the electrons produced by the various electron guns reach the screen of shadow mask-type tubes, the rest being blocked by the mask. In addition to the requirement that the power source produce a relatively high output current, it must be regulated to provide a substantially constant voltage output up to a predetermined maximum current.

In either monochrome or color receivers the settings of the contrast and brightness controls along with the luminance content of the transmitted image determine the amount of current which the power source must supply. If the viewer sets the contrast control to produce relatively high contrast in the image, and in addition, adjusts the brightness control to a position which provides a relatively bright picture, the high voltage power supply may become overloaded. Overloading which exceeds the range of the voltage regulator of the power supply causes a reduction in the voltage output. The result is undesirable raster blooming and/or defocusing in the reproduced image. In addition, an extreme overload for a sufficient period of time may result in the destruction of certain circuit components associated with the high voltage power supply.

It has been found that conventional clamping circuits may be employed to reduce the level of the brightness components. While clamping circuits are applicable to color receivers of certain construction, their use presents a distinct problem in receivers which utilize an unterminated time-delay equalizing network in the luminance channel. In particular, the clamp circuit may introduce an unwanted condition of multiple signal reflections caused by improper termination of the delay network.

It is a primary object of this invention to provide a new and improved luminance control circuit for a television receiver which overcomes the aforenoted disadvantages and deficiencies of prior circuits.

It is also an object of this invention to provide a new and improved luminance circuit which prevents defocusing and/or blooming of the reproduced image of a television receiver.

It is another object of this invention to provide a new and improved control circuit for use in a color television receiver which prevents the high voltage power supply of the receiver from becoming overloaded.

In accordance with the invention, a luminance control circuit for a television receiver which may receive color signals transmitted in accordance with the Federal Communications Commission system comprises a signal source for providing a luminance signal having amplitude variations representative of an image to be reproduced and a luminance signal translating channel, including an electron device, for translating the luminance signal to an image reproducing device. In addition, the control circuit comprises a luminance-signal time delay network included in the channel, terminated at one end in its characteristic impedance and coupled at its terminated end to the electron device. There are means for coupling the remaining end of the delay network to the luminance signal source. Furthermore, the circuit comprises clamping means coupled to the remaining end of the delay network, including a rectifier poled to be responsive to amplitude excursions of the luminance signal in the white direction, for producing a unidirectional potential when the amplitude excursions exceed a predetermined threshold amplitude level and means for applying the unidirectional potential to the electron device for changing the operating point thereof.

The features of this invention which are believed to be novel are set forth with particularity in the appended claims. The invention, together with its further objects and advantages thereof, may be best understood, however, by reference to the following description taken in conjunction with the accompanying drawing, the single figure of which is a schematic diagram of a television receiver embodying the luminance signal control circuitry of the invention.

Referring now more particularly to the single figure, the color television receiver there represented includes an antenna 10 coupled to the input circuit of a tunable radio-frequency amplifier and first detector 11. The output terminal of this amplifier and detector connects through an intermediate-frequency amplifier 12 to a sound and sync detector 13 as well as a luminance (Y) and chrominance (C) detector 14. Detector 13 in turn connects to a sound and synchronizing signal separator and amplifier 17 which, in turn, connects to an audio system 25 and horizontal and vertical scanning generators and convergenec network 23. Generating network 23 includes the usual circuitry for developing vertical or field deflection signals which are applied to appropriate deflection yokes positioned about cathode-ray tube 16.

The color tube 16, which is a conventional shadow mask picture tube, includes a tri-color image screen or target 18 to be scanned by a group of three electron beams developed by individual guns housed within the tube. A parallax mask 19 is included in the image reproducer 16 to restrict the electron beams generated in the guns in a known manner so that each beam is permitted to impinge upon only one color phosphor of image target 18. Horizontal and vertical scanning generators and convergence networks 23 are also coupled to a convergence yoke 24 which is positioned about the tube neck to insure proper convergence of the beams at the tube screen. The remaining components of the tube, including the electron lens system, have been omitted for the simple reason that the subject of the present invention is not concerned with the details of this portion of the reproducer and also because such details are well understood in the art.

The three cathodes of the electron guns are coupled to a color balance network 9 which connects to Y-C detector 14 by means of a luminance (Y) amplifier 15 which will be explained more fully hereinafter. It is sufficient to say that color balance network 9 includes potentiometers for varying the amount of signal presented to the various cathodes of the electron guns; however, for the purposes of discussion the three cathodes may be considered as one. The control electrodes of the guns are coupled to a chrominance amplification and processing network 26 which is also coupled to Y-C detector 14.

The previously mentioned deflection yokes comprise coils 20, 21 which are appropriately driven by the horizontal and vertical scanning generator network 23. A suitable high voltage operating potential is applied to the screen 18 and mask 19 of the tube 16 by regulated high voltage supply network 29 which is also coupled to network 23.

As thus described, the receiver is entirely conventional so that only a brief description of its operation need be recited here. The received color telecast intercepted by antenna 10 is selected by appropriate adjustment of the tunable stages of RF amplifier and first detector 11 wherein it is amplified and converted to an appropriate intermediate-frequency signal which is amplified in amplifier 12. The intermediate-frequency signal is then applied to Y-C detector 14 and to sound and sync detector 13. The output signal of detector 14 is applied to the Y amplifier 15 to develop a luminance signal which is applied to the color balance network 9 and thence to the cathodes of the electron guns of the picture tube. Furthermore, the Y-C detector 14 also presents an output signal to chrominance amplification and processing network 26 which develops the chroma signal information for concurrent application to the three electron guns of tube 16.

The output signal from the sound sync detector 13 concurrently drives audio system 25 in known fashion to produce the audio program accompanying the telecast and is used to control the vertical and horizontal sweep circuits of generator network 23. Accordingly, appropriate synchronizing scanning signals are developed and applied to the deflection yokes 20, 21 of the picture tube 16 to deflect electron beams issued by the guns across the target electrode 18 and develop the usual image raster thereupon.

Since the electron beams are suitably modulated by the luminance information from detector 14 and by chrominance information from network 26, their traverse of target 18 under the influence of the deflection fields of the scanning yoke results in the reproduction of a visual image. Since the parallax electrode or shadow mask 19 enables each electron beam to see but a single color phosphor on its traverse of target 18, the reproduction is in fact that of three image fields effectively superposed to yield an image in simulated natural color. The necessary final anode voltage and focus voltage are supplied by the regulated high voltage supply 29 to tube 16 as required for its operation in the reproduction of images.

More particular consideration will now be given to that portion of the receiver which constitutes a luminance control circuit embodying the invention. This control circuit comprises a signal source for providing a luminance signal having amplitude variations representative of an image to be reproduced. It is convenient to consider detector 14 as this signal source.

There is a luminance channel for translating the luminance signal to image reproducer 16. This channel may be thought of as amplifier 15 and color balance network 9. It includes an electronic discharge device shown as a pentode amplifier 60. The cathode of tube 60 is grounded, its first electrode 81 is the signal receiving electrode and its screen electrode 82 is energized by potential source B+ through a resistor 84 which is bypassed at signal frequencies by a capacitor 83. The suppressor electrode 85 is grounded and the anode or plate 86 is coupled to source B+ through a load resistor 87.

Also included within the luminance channel is a time delay equalization network 46. This network is properly terminated at one end, that is to say, it is terminated in its characteristic impedance. Specifically, the output end of the network is so terminated by the series arrangement of an inductor 50, a resistor 51, and a variable resistor 52. By having at least one of the components of this termination variable, there is sufficient flexibility to accomplish proper termination while making allowance for the tolerances of the circuit elements. The terminated end of delay line 46 is coupled to signal electrode 81 of tube 60 through a capacitor 53.

The arrangement further includes means for coupling the remaining or input end of the delay network to luminance signal source 14. As shown, this means is a triode 40 arranged as a cathode follower having a potentiometer 44 in its cathode circuit serving as a contrast control. The adjustable tap of this potentiometer connects to the input terminal of network 46. The signal electrode 42 of the cathode follower is connected to luminance detector 14 while its anode 41 is energized from a potential source B+.

The luminance channel as thus far described, is effective to apply the alternating-current components of the luminance signal, time delayed for purposes of equalization, to amplifier 60 and it is, of course, necessary to add the direct-current component. This is accomplished by coupling signal electrode 81 of the amplifier through the series arrangement of resistors 61 and 66 to a terminal of detector 14 where the D.C. component is available. Signal grid 81 is returned through resistor 61, a resistor 75, a potentiometer 74 and a resistor 73 to a source of bias potential which may be −90 volts. Potentiometer 74 serves as a brightness control by permitting manual adjustment of the static operating bias of signal electrode 81.

It is necessary, in practicing the invention, to provide clamping means for producing a unidirectional potential to be used in obviating or minimizing blooming. This means is provided by a rectifier 70 which is poled to be responsive to amplitude excursions of the luminance signal in the white direction. More particularly, the rectifier is a diode having an anode coupled to the input terminal of delay network 46 through a capacitor 45 and having a cathode which connects with the adjustable tap of a potentiometer 72. Potentiometer 72 in conjunction with resistor 73 and the bias source constitute means for applying an amplitude-delay bias to diode 70. The cathode of the diode is bypassed for signal frequencies by a capacitor 71. The junction of capacitor 45 and diode 70 is connected in the D.C. signal path to electrode 81 of amplifier 60 and this circuit connection provides means for applying a unidirectional potential developed in capacitor 45 to tube 60 to change or adjust its operating point.

In considering the operation of the luminance channel, specifically the portion thereof included within broken-line rectangular 15, it is apparent that the A.C. components of the luminance signal are applied to the input of amplifier 60 through delay network 46 while the D.C. component thereof is currently applied to the input of the amplifier through resistors 61 and 66. The contrast or amplitude range of the luminance signal is adjusted to a desired value by manipulation of contrast control 44. At the same time the brightness of the reproduced image is established as desired by adjustment of potentiometer 74. If the possibility of overload is ignored for the moment, the full luminance signal, representing the image with the contrast and brightness selected by the viewer, is applied through color balance network 9 to tube 16 for utilization in image reproduction.

The load imposed upon power supply 29 is determined by the adjustments of the contrast and brightness controls. The present invention affords a relatively wide range of brightness and contrast while minimizing blooming or defocusing effects during instances in which the luminance signal represents high level or white image components. It is the function of clamping diode 70 to achieve this result.

The luminance signal as developed in the cathode circuit of cathode follower 40 has synchronizing components which extend in a negative direction and video or image components extending in the opposite or positive direction. This signal is applied to the anode of the clamping diode and the diode consequently tends to conduct on the amplitude excursions in the positive or white direction. Adjustment of potentiometer 72 permits the diode to conduct only in response to such amplitude excursions which exceed a selected amplitude level. So long as the threshold level has not been exceeded, there is no real danger of overload and blooming. It is convenient to adjust the threshold by establishing the contrast and brightness controls 44 and 74 to maximum and then establish the adjustable tap on potentiometer 72 to a value which just precludes defocusing or blooming.

Having adjusted the clamping circuit as described, if the image components of the luminance signal exceed the threshold of the clamp, diode 70 conducts and develops a substantially unidirectional control potential on capacitor 45. It is applied through resistor 61 to signal grid 81 of tube 60 and is of negative polarity. Therefore, it tends to adjust the operating point of the amplifier to avoid the overload that power supply 29 would otherwise experience in the presence of such high amplitude excursions of the luminance signal. The change in bias on tube 60, in effect, backs the luminance signal off so to speak and prevents overloading of the supply system. When the amplitude excursions of the luminance signal moderate and become less than the threshold of clamp 70, the bias condition of amplifier 60 returns to its normal value.

The power supply 29 may accommodate momentary conditions of overload but it will not support overload for any prolonged period of time. It is protected against having to withstand prolonged overload by the described action of the clamping diode.

It is, of course, appreciated that the clamping circuit is a variable impedance coupled at the receiving end of delay line 46. This impedance changes from a very high value when diode 70 is nonconductive to a relatively low value during intervals in which it does conduct. While this varies the termination at the input of delay line, it is not objectionable. The delay line is usually mismatched at its sending end because the contrast control 44 is seldom of the appropriate value properly to terminate the line at its input. Since the opposite or output of the line is matched, no condition of multiple reflections is encountered and the clamping diode, arranged as described, may accomplish its desired function without introducing any impairment in the operation of the luminance channel.

The described arrangement is further advantageous in that the specific characteristics of amplifier tube 60 are of no moment in contrast to other circuit arrangements which rely on input circuit rectification of the luminance amplifier in order to achieve a clamping effect.

In some clamping circuits low frequency errors arise because the time constant of the resistors and capacitors associated with the clamp diode may be short with respect to the signal frequency. These low frequency errors can generally be suppressed by making the associated time constant very long which is conventionally accomplished by employing a large capacitor which in some clamping circuits may be disadvantageous as well as expensive. In the circuit of the invention the discharge time constant of capacitor 45 and its associated resistors is relatively short; however, any low frequency errors which may result are largely attenuated by the voltage divider network one leg of which comprises resistor 61 and the other of which comprises capacitor 53 and the delay line termination network and thereby reduced when presented to input electrode 81 of tube 60. If the grid-cathode diode of amplifier tube 60 was employed, the low frequency errors present at the tube's grid could be minimized only by making the grid time constant long which entails an unnecessarily large blocking capacitor 53. Thus, the circuit of the invention has another advantage over other arrangements which utilize input rectification.

The described arrangement is an effective and inexpensive protective circuit to minimize blooming and defocusing otherwise attributable to overload in the color receiver. The protective circuit accomplishes its function without imposing operating difficulties in the luminance channel.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A luminance control circuit for a television receiver comprising:
 a signal source for providing a luminance signal having amplitude variations representative of an image to be reproduced;
 a luminance signal translating channel, including an electron device, for translating said luminance signal to an image-reproducing device;
 a luminance-signal time delay network included in said channel, terminated at one end in its characteristic impedance and coupled at said terminated end to said electron device;
 means for coupling the remaining end of said delay network to said source;
 clamping means, coupled to said remaining end of said delay network including a rectifier poled to be responsive to amplitude excursions of said luminance signal in the white direction, for producing a unidirectional potential when said amplitude excursions exceed a predetermined threshold amplitude level;
 and means for applying said unidirectional potential to said electron device for changing the operating point thereof.

2. A luminance control circuit for a television receiver comprising:
 a signal source for providing a luminance signal having amplitude variations representative of an image to be reproduced;
 a luminance signal translating channel, including an electron device, for translating said luminance signal to an image-reproducing device;
 a luminance-signal time delay network included in said channel, terminated at one end in its characteristic impedance and coupled at said terminated end to said electron device;
 means for coupling the remaining end of said delay network to said source;
 clamping means, coupled to said remaining end of said delay network including a rectifier poled to be responsive to amplitude excursions of said luminance signal in the white direction, for producing a unidirectional potential;
 means for applying said unidirectional potential to said electron device for changing the operating point thereof;
 a source of biasing potential;
 and adjusting means coupled between said biasing potential source and said clamping means for rendering said clamping means operative only when said amplitude excursions exceed a predetermined threshold amplitude level.

3. A luminance control circuit for a television receiver comprising:

a signal source for providing a luminance signal having amplitude variations representative of an image to be reproduced;

a luminance signal translating channel, including an electron device, for translating said luminance signal to an image-reproducing device;

a luminance-signal time delay network included in said channel, terminated at one end in its characteristic impedance and coupled at said terminated end to said electron device;

means for coupling the remaining end of said delay network to said source;

clamping means, coupled to said remaining end of said delay network including a rectifier poled to be responsive to amplitude excursions of said luminance signal in the white direction, for producing a unidirectional potential when said amplitude excursions exceed a predetermined threshold amplitude level;

and means, including a signal attenuation network for reducing the magnitude of any alternating-current error signals developed by said rectifier, for applying said unidirectional potential to said electron device for changing the operating point thereof.

References Cited in the file of this patent

UNITED STATES PATENTS

| | | |
|---|---|---|
| 2,999,897 | Heuer et al. | Sept. 12, 1961 |
| 3,009,989 | Ahrons et al. | Nov. 21, 1961 |